United States Patent
Cruickshank, III

(10) Patent No.: US 10,372,188 B2
(45) Date of Patent: Aug. 6, 2019

(54) ELECTRICAL POWER MANAGEMENT

(71) Applicant: Robert F. Cruickshank, III, Big Indian, NY (US)

(72) Inventor: Robert F. Cruickshank, III, Big Indian, NY (US)

( * ) Notice: Subject to any disclaimer, the term of this patent is extended or adjusted under 35 U.S.C. 154(b) by 0 days.

(21) Appl. No.: 16/165,884

(22) Filed: Oct. 19, 2018

(65) Prior Publication Data

US 2019/0086985 A1    Mar. 21, 2019

Related U.S. Application Data

(63) Continuation of application No. 15/679,683, filed on Aug. 17, 2017, now Pat. No. 10,133,333.

(Continued)

(51) Int. Cl.
*G06F 1/26* (2006.01)
*H02J 3/00* (2006.01)
(Continued)

(52) U.S. Cl.
CPC .......... *G06F 1/3206* (2013.01); *G06F 1/3296* (2013.01); *G06F 11/3062* (2013.01); *G06Q 30/0223* (2013.01); *G06Q 30/0611* (2013.01); *G06Q 50/06* (2013.01); *H02J 3/00* (2013.01); *H02J 3/14* (2013.01); *G06F 1/26* (2013.01);
(Continued)

(58) Field of Classification Search
CPC ...... G06F 11/3062; G06F 1/26; G06F 1/3206; G06F 1/3296; G06Q 30/0223; G06Q 30/0611; G06Q 50/06; H02J 2003/003; H02J 2003/146; H02J 3/00; H02J 3/14; H02J 3/382; Y02B 70/3225
See application file for complete search history.

(56) References Cited

U.S. PATENT DOCUMENTS

2009/0048718 A1   2/2009   Richard et al.
2010/0010857 A1   1/2010   Fadell
(Continued)

FOREIGN PATENT DOCUMENTS

| EP | 3032692 A1 | 6/2016 |
| JP | 2013198360 A | 9/2013 |
| WO | 2010083334 A1 | 7/2010 |

OTHER PUBLICATIONS

International Search Report and Written Opinion dated Oct. 27, 2017 for PCT Patent Application No. PCT/US2017/047353.
(Continued)

*Primary Examiner* — Terrell S Johnson
(74) *Attorney, Agent, or Firm* — MLO, a professional corp.

(57) ABSTRACT

A method includes a power supply system receiving a first request for a first quantity of power for a first time period from a first unit. The system generates a first quote based on an available power generation capacity, environmental factors and a forecasted level of power consumption. The system transmits the first quote to the first unit. The system receives a second request for a second quantity of power for a second time period. The system generates a second quote based on the same factors as the first quote. The system transmits the second quote to the second unit. The value of the first quote and the value of the second quote are set to discourage demand in a first mode and to encourage demand in a second mode to maximize efficient operating levels of the power generation sources in both the first mode and the second mode.

20 Claims, 11 Drawing Sheets

Related U.S. Application Data

(60) Provisional application No. 62/377,648, filed on Aug. 21, 2016.

(51) Int. Cl.
  *H02J 3/14* (2006.01)
  *H02J 3/38* (2006.01)
  *G06F 11/30* (2006.01)
  *G06Q 30/02* (2012.01)
  *G06Q 30/06* (2012.01)
  *G06Q 50/06* (2012.01)
  *G06F 1/3206* (2019.01)
  *G06F 1/3296* (2019.01)

(52) U.S. Cl.
  CPC ......... *H02J 3/382* (2013.01); *H02J 2003/003* (2013.01); *H02J 2003/146* (2013.01); *Y02B 70/3225* (2013.01); *Y04S 10/54* (2013.01); *Y04S 20/222* (2013.01); *Y04S 20/224* (2013.01); *Y04S 50/10* (2013.01); *Y04S 50/14* (2013.01)

(56) References Cited

U.S. PATENT DOCUMENTS

| | | |
|---|---|---|
| 2014/0074542 A1 | 3/2014 | Edens |
| 2014/0121849 A1 | 5/2014 | Ansari et al. |
| 2015/0145335 A1 | 5/2015 | Lyren et al. |
| 2015/0277410 A1 | 10/2015 | Gupta et al. |
| 2016/0124411 A1 | 5/2016 | Tinnakornsrisuphap et al. |

OTHER PUBLICATIONS

Notice of Allowance dated Jul. 18, 2018 for U.S. Appl. No. 15/679,683.

Office Action dated Dec. 20, 2017 for U.S. Appl. No. 15/679,683.

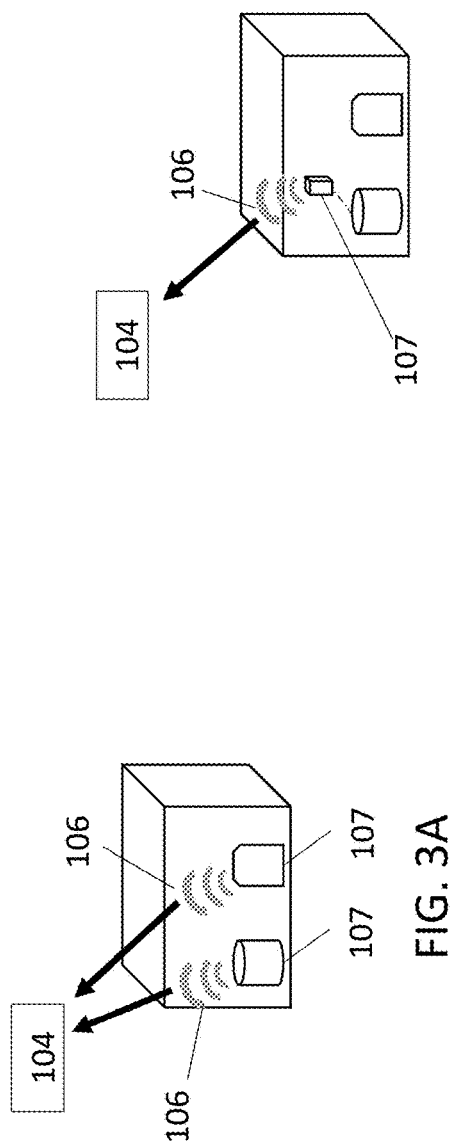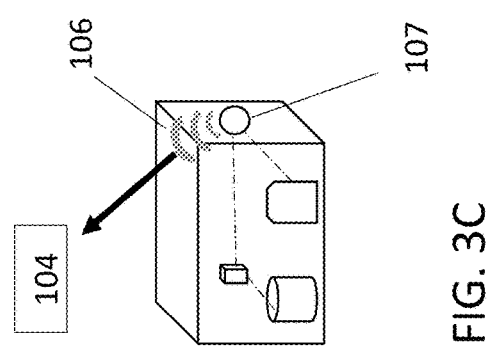

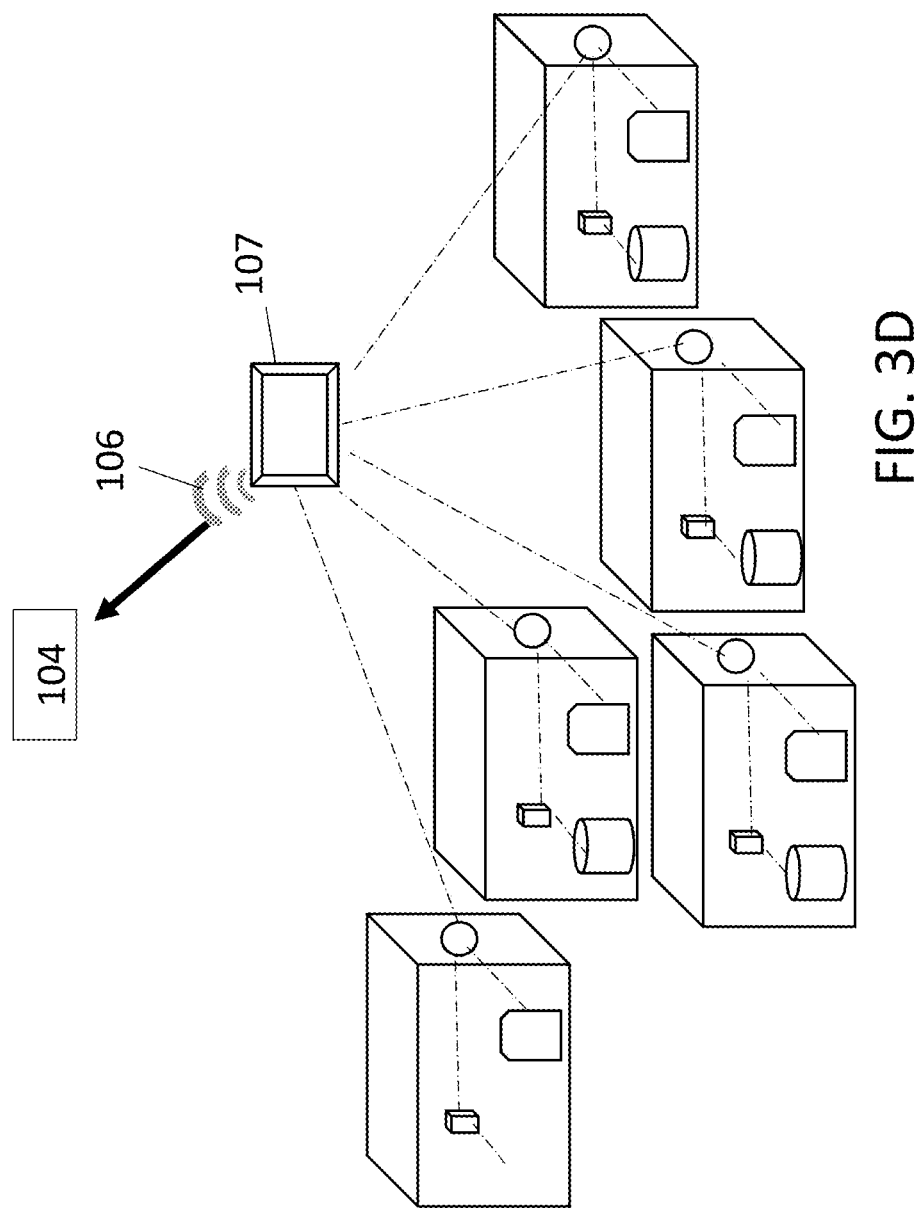

401
receiving, by a system from a first unit, a first demand request for a first quantity of power for a first time period having a first starting time and a first duration

402
generating, by the system, a first price quote in response to the first demand request, the first price quote based on an available power generation capacity of power generation sources, environmental factors and a forecasted level of power consumption

403
transmitting, by the system to the first unit, the first price quote

404
receiving, by the system from a second unit, a second demand request for a second quantity of power for a second time period having a second starting time and a second duration, the second starting time being different from the first starting time, and the second time period overlapping at least a portion of the first time period

405
generating, by the system, a second price quote in response to the second demand request, the second price quote based on the available power generation capacity of the power generation sources, the environmental factors and the forecasted level of power consumption

406
transmitting, by the system to the second unit, the second price quote

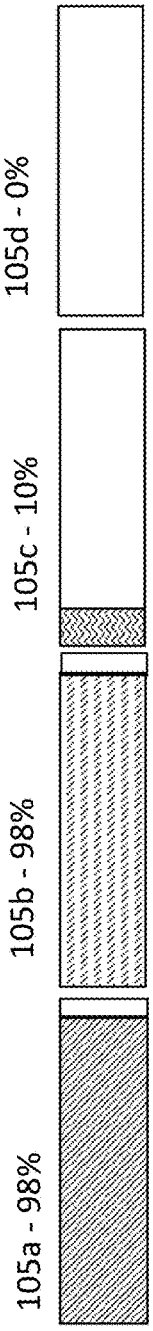
FIG. 7
FIG. 8A
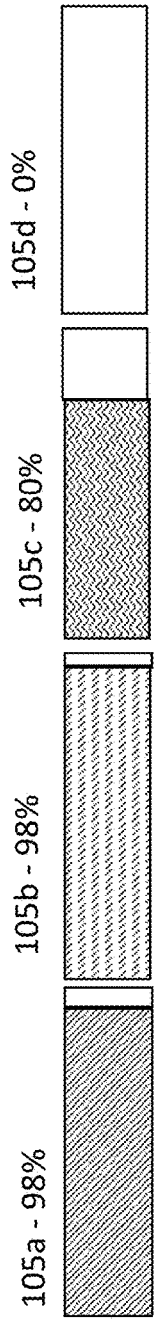
FIG. 8B

ELECTRICAL POWER MANAGEMENT

RELATED APPLICATIONS

This application is a continuation of U.S. patent application Ser. No. 15/679,683, filed on Aug. 17, 2017 and entitled "Electrical Power Management", which claims priority to U.S. Provisional Patent Application No. 62/377,648, filed on Aug. 21, 2016 and entitled "Electrical Power Management," both of which are hereby incorporated by reference for all purposes.

BACKGROUND

Distributors of power face time-varying supply from solar and wind energy and time-varying demand for electricity from customers. The demand for electricity for the residential market, for example, is increasing due in part to the proliferation of a variety of home devices, enabling communications, Internet connectivity, multimedia and entertainment activities, or the like, in addition to more traditional home devices, such as air conditioners, water heaters, ovens, etc. Appliances in the home for each household put significant pressure on the electricity grid of local, regional or national electricity providers.

A significant issue for an electricity power provider is providing power during peak times of electricity demand. These peaks may be relatively short in terms of duration, but the electricity grid through which the electricity power provider delivers the electricity is dimensioned to support these peaks. Outside peak periods, the demand for electricity is lower, but the infrastructure to support peaks of electricity demand is still present. The electricity power providers typically try to forecast the level of demand that is likely to occur, particularly the time, duration and level of peak demands.

Peaks of electricity demand may or may not occur at the same time period within a day. Electricity power providers typically lower their price outside of the peak demand period and increase their price for power during the peak demand period, thus simply reacting to supply and demand variations. These practices may be inconvenient for the customer because the end user may have to adapt their electricity consumption patterns in response to the price, in order to control their electricity bills. However, the electricity power provider establishes some control over the forecasted demand by use of these price incentives.

Another significant issue for an electricity power provider is the management of a variety of power generation sources during peak and off-peak. The electricity power provider typically has several power generation sources, each of which may have a different power generation capacity (typically measured in kilowatts or megawatts) and sometimes using a variety of different types of power generation fuels (e.g., coal, natural gas, wind, solar, etc.). At any given time, the electricity power provider will have activated (i.e., turned on or brought online) only a minimum number of the power generation sources needed to satisfy the current electricity demand level, so that most of the power generation sources can be operated at or near their maximum power generation capacity. Then, when electricity demand increases or decreases, the electricity power provider typically activates or deactivates, respectively, another power generation source as needed. Under this technique, since most power generation sources operate most efficiently at or near their maximum power generation capacity, the electricity power provider may be able to operate all but one of the activated power generation sources at maximum power generation capacity, so that the efficiency of these power generation sources is maximized. The one other activated power generation source, on the other hand, does not necessarily operate at maximum capacity or efficiency, since it simply produces electricity at whatever level is needed to fill out the current electricity demand. In this manner, the electricity power provider achieves the highest operating efficiency (and lowest cost) for its overall power generation operations, except for the power generation source that is not operating at maximum capacity.

SUMMARY

A method is disclosed herein including a power supply system receiving a first demand request for a first quantity of power for a first time period having a first starting time and a first duration from a first unit. The power supply system generates a first price quote in response to the first demand request. The first price quote is based on an available power generation capacity of power generation sources, environmental factors and a forecasted level of power consumption. The power supply system transmits the first price quote to the first unit. The power supply system receives a second demand request for a second quantity of power for a second time period having a second starting time and a second duration, the second starting time being different from the first starting time, and the second time period overlapping at least a portion of the first time period from a second unit. The power supply system generates a second price quote in response to the second demand request. The second price quote is based on the available power generation capacity of the power generation sources, the environmental factors and the forecasted level of power consumption. The power supply system transmits the second price quote to the second unit. The value of the first price quote and the value of the second price quote are set to discourage demand of the power in a first mode and to encourage demand of the power in a second mode to maximize efficient operating levels of the power generation sources in both the first mode and the second mode.

BRIEF DESCRIPTION OF THE DRAWINGS

FIGS. 3A-3D show simplified examples of appliances/units in accordance with some embodiments;

FIG. 4 is a flowchart for a method for requesting blocks of electrical power in accordance with some embodiments;

FIGS. 7, 8A and 8B are simplified schematics detailing the power generation source capacity for the demand request in accordance with some embodiments;

DETAILED DESCRIPTION

Figure 1:
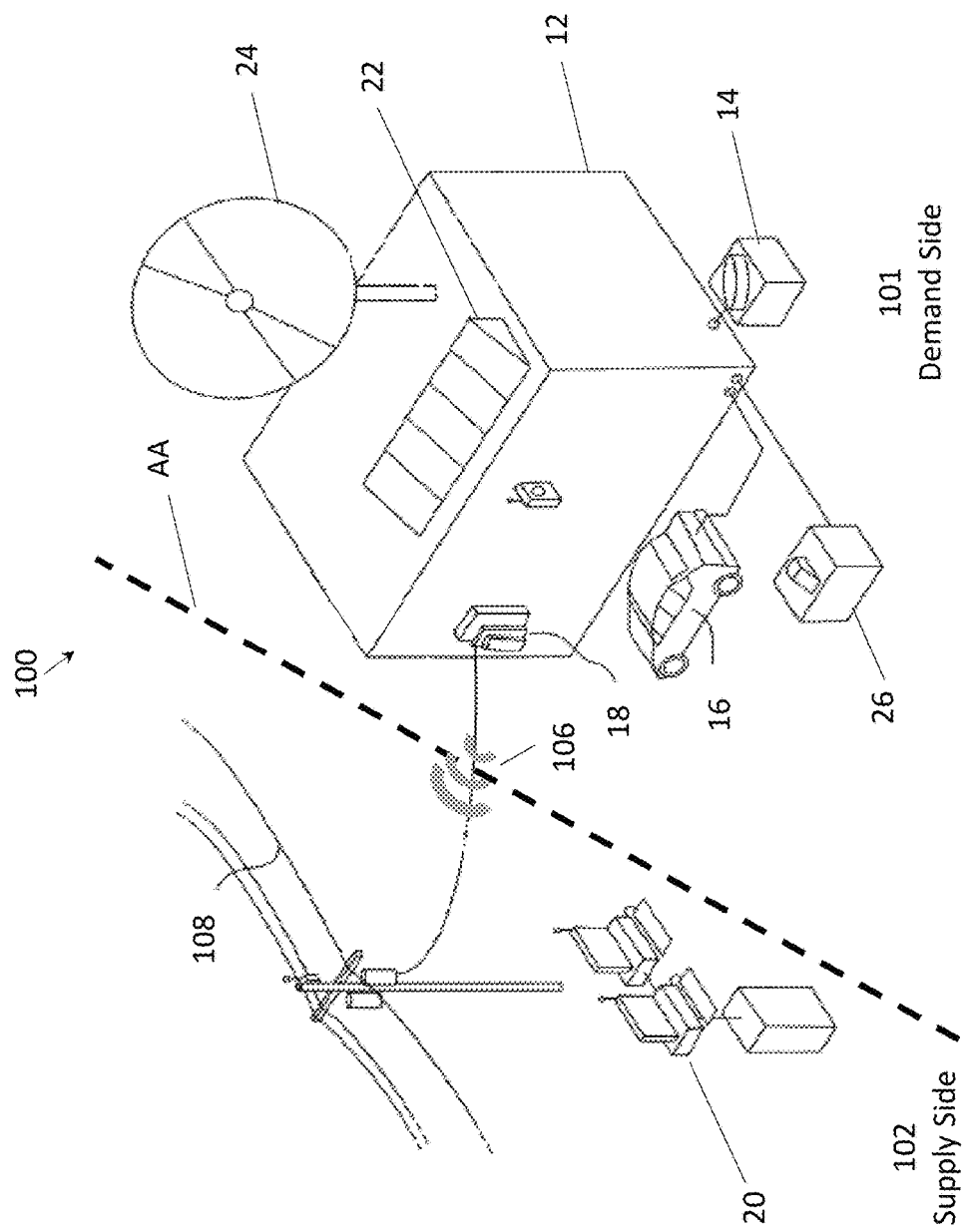
FIG. 1 is a simplified schematic diagram of an environment for an electrical power method of managing demand requests for blocks of electrical power in accordance with some embodiments.

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

The present application manages power generation, distribution and consumption through a request method. For example, a demand side requests power based on anticipated needs in terms of blocks from a power provider or the supply side. The supply side then provides a price quote for the requested block of power. The price quote is set to discourage demand of the power in a first mode and to encourage demand of the power in a second mode to maximize efficient operating levels of the power generation sources in both the first mode and the second mode. In some embodiments, this may mean to ideally and intentionally, operate the available power generation sources at full capacity while offering a lower price quote. In this way, customers save money while the use of power generation sources or energy resources is maximized and the efficiency of power generation is increased. This is counterintuitive in the industry because typically, the same price is broadcast to all customers based on demand and supply. Moreover, in a conventional system, during a peak demand time as less resources are available, a higher, single price quote is broadcast to every customer. Therefore, all customers receive the same price.

Utilizing this method maximizes efficient operating levels of the power generation sources by reducing or controlling the energy reserve and the level of curtailment of the power generation sources. For example, the method enables renewable energy sources such as solar or wind power to be utilized or taken advantage of when available. This provides control over aggregate demand by encouraging customer demand through the price quote when renewable energy sources are available.

A method for requesting blocks of electrical power is disclosed herein including a power supply system receiving a first demand request for a first quantity of power for a first time period having a first starting time and a first duration from a first unit. The power supply system generates a first price quote in response to the first demand request. The first price quote is based on an available power generation capacity of power generation sources, environmental factors and a forecasted level of power consumption. The power supply system transmits the first price quote to the first unit. The power supply system receives a second demand request for a second quantity of power for a second time period having a second starting time and a second duration, the second starting time being different from the first starting time, and the second time period overlapping at least a portion of the first time period from a second unit. The power supply system generates a second price quote in response to the second demand request. The second price quote is based on the available power generation capacity of the power generation sources, the environmental factors and the forecasted level of power consumption. The power supply system transmits the second price quote to the second unit. The value of the first price quote and the value of the second price quote are set to discourage demand of the power in a first mode and to encourage demand of the power in a second mode to maximize efficient operating levels of the power generation sources in both the first mode and the second mode.

In some embodiments, the first unit or the second unit may include, or be integrated into, an appliance. In some embodiments, the first unit or the second unit may include a controller for the appliance coupled to the appliance or located remotely from the appliance. The controller and appliance may be located in the same facility. In some embodiments, the first unit or the second unit may include an electricity meter configured to communicate with one or more appliances. The one or more appliances may be located in the same facility. In some embodiments, the first unit or the second unit may include a master controller configured to communicate with one or more appliances. The one or more appliances may be located in a plurality of facilities.

The environmental factors may include outdoor air temperature, relative humidity, solar energy, wind energy, diffuse and direct solar insolation and wind speed. The first price quote and the second price quote may be available for a limited time period.

In some embodiments, the first price quote and the second price quote are further based on an energy reserve. The first price quote and the second price quote are generated to reduce the energy reserve of at least one power generation source. In some embodiments, the first price quote and the second price quote are further based on a level of curtailment of power produced by solar energy and wind energy. The first price quote and the second price quote are generated to reduce the level of curtailment of power produced by solar energy and wind energy of at least one power generation source.

In some embodiments, the first quantity of power and the second quantity of power contribute to an overall power consumption which is less than the forecasted level of power consumption. The method for requesting blocks of electrical power further includes activating a power generation source when the first quantity of power and the second quantity of power contribute to an overall power consumption which is greater than the forecasted level of power consumption.

The method for requesting blocks of electrical power further includes receiving an acceptance of the first price quote by the system from the first unit and the system distributing the first quantity of power for the first time period starting at the first starting time.

A method for requesting blocks of electrical power between a demand side and a supply side is disclosed. A first processor sends a first demand request for a first quantity of power for a first time period having a first starting time and a first time duration. The first demand request is received by a computerized system. The system generates a first price quote in response to the first demand request. The first price quote is based on an available power generation capacity of power generation sources, environmental factors and a forecasted level of power consumption. The first price quote is transmitted to the first processor by the system. The first price quote is received by the first processor.

A second processor sends a second demand request for a second quantity of power for a second time period having a second starting time and a second time duration. The second starting time is different from the first starting time, and the second time period overlaps at least a portion of the first time period. The system receives the second demand request. The system generates a second price quote in response to the second demand request. The second price quote is based on the available power generation capacity of the power generation sources, the environmental factors and the forecasted level of power consumption. The system transmits the second price quote to the second processor. The second processor receives the second price quote. The value of the first price quote and the value of the second price quote are set to discourage demand of the power in a first mode and to encourage demand of the power in a second mode to maximize efficient operating levels of the power generation sources in both the first mode and the second mode.

In some embodiments, the method for requesting blocks of electrical power between a demand side and a supply side further includes the first processor accepting the first price quote. The system then distributes the first quantity of power for the first time period starting at the first starting time.

A system for requesting blocks of electrical power is disclosed herein. The system includes a receiver that receives a first demand request for a first quantity of power for a first time period having a first starting time and a first time duration from a unit. The receiver also receives a second demand request for a second quantity of power for a second time period having a second starting time and a second time duration from a second unit. The second starting time is different from the first starting time, and the second time period overlaps at least a portion of the first time period.

A processor generates a first price quote in response to the first demand request. The first price quote is based on an available power generation capacity of power generation sources, environmental factors and a forecasted level of power consumption. The processor also generates a second price quote in response to the second demand request. The second price quote is based on the available power generation capacity of power generation sources, the environmental factors and the forecasted level of power consumption.

A transmitter transmits the first price quote to the first unit and transmits the second price quote to the second unit. The value of the first price quote and the value of the second price quote are set to discourage demand of the power in a first mode and to encourage demand of the power in a second mode to maximize efficient operating levels of the power generation sources in both the first mode and the second mode.

FIG. 1 is a simplified schematic diagram of the environment for an electrical power system 100 for managing demand requests for blocks of electrical power in accordance with some embodiments. In this illustrative example, a demand side 101 and a supply side 102 are theoretically separated by a dashed line AA. On the demand side 101, a facility 12 such as a home or business has a variety of devices that consume power. For example, these may be typical devices such as a heater device, an air conditioning device 14, a water heater, household appliances or a rechargeable electric or hybrid vehicle 16. A customer portal 18, which may include an electrical level meter from an electricity power provider is provided to assist in the orchestration of the supply/demand relationship by, in some embodiments, controlling the household appliances and reporting the power consumption metering information. The facility 12 may also produce power for its own use such as by at least one solar panel 22 or a windmill 24, and may have a distributed generation storage system 26.

Referring to the supply side 102, the customer portal 18 of the demand side 101 is in communication with an interface 20 of the electricity power provider on the supply side 102. In some embodiments, data communication between the demand side 101 and the supply side 102 is transmitted in real-time through a data communication network 106, such as the Internet, a WAN, a LAN, or the like and may be wired, wireless or a hybrid combination thereof. This may be achieved through a WiFi system, Bluetooth® wireless technology, Ethernet, Power over Ethernet (POE), router, cellular communications, satellite communications, utility power lines or the like. The data communication is between interface devices or units such as computers, mobile devices, meters, appliances, or the like.

The demand side 101 and the supply side 102 are interconnected through a power grid 108. The power grid 108 generally represents power grid lines with power distribution components, such as high tension wires and power transformers. The power grid lines facilitate the power transmission movement and electric power distribution. This may be unidirectional allowing power transmission from the supply side 102 to the demand side 101, or optionally, bidirectional enabling power transmission from the demand side 101 to the supply side 102. For example, the facility 12 may sell an overflow or oversupply of their own produced power to the electricity power provider on the supply side 102.

Figure 2:
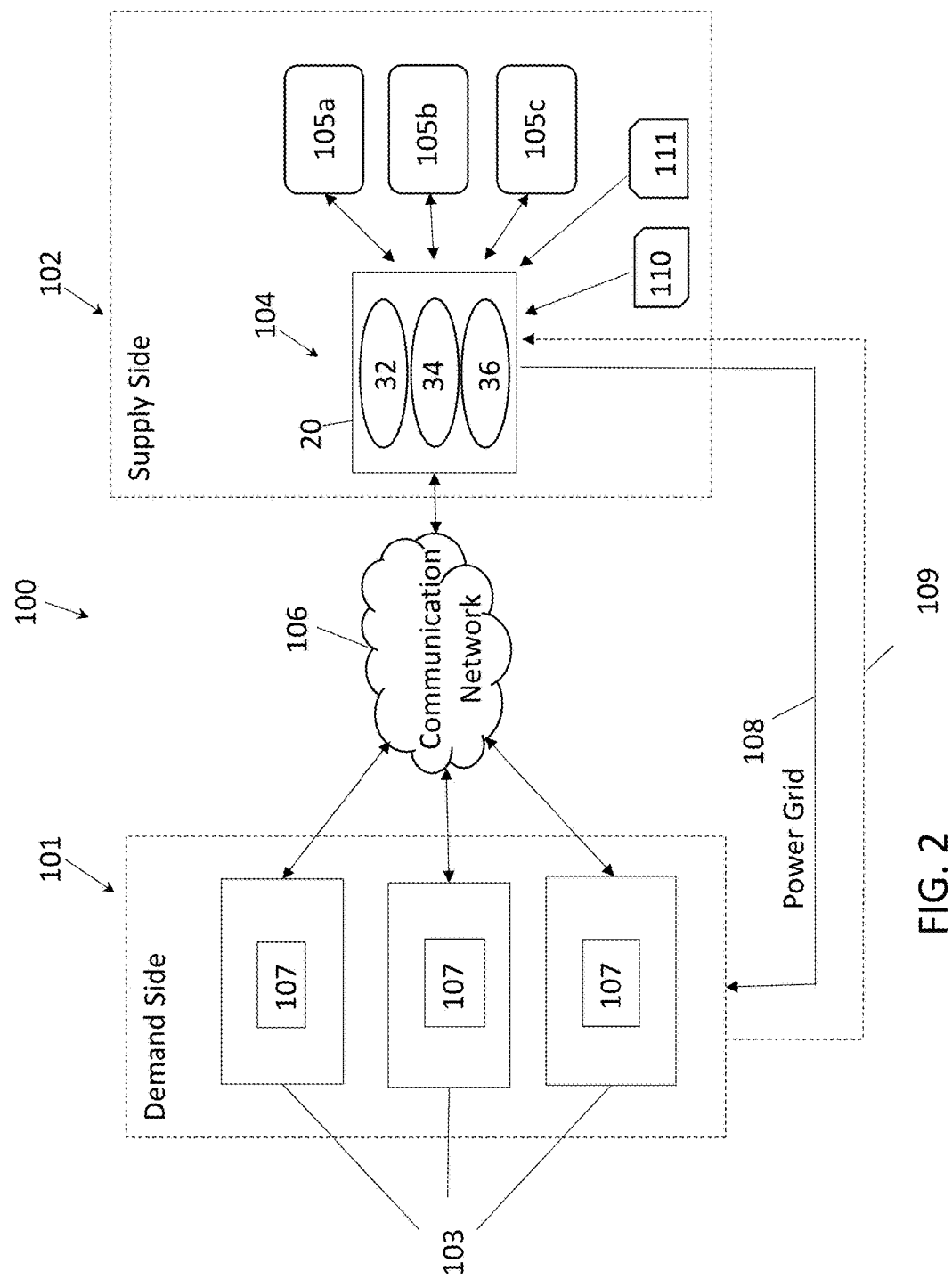
FIG. 2 is a simplified schematic diagram of an electrical power system in accordance with some embodiments.

FIG. 2 is a simplified schematic diagram of an electrical power system 100 in accordance with some embodiments. The electrical power system 100 generally includes the demand side 101 and the supply side 102. The demand side 101 includes a plurality of customers 103 who utilize or consume electrical power generated by the supply side 102. The supply side 102 includes an electrical power management system 104 having an interface 20 with a receiver 32, processor 34 and a transmitter 36, and a plurality of power generation sources 105 which provide the power. The illustrated elements are shown for explanatory purposes only. Other embodiments may use other elements or combinations of elements.

Some or all of the customers 103 generate and transmit demand requests for blocks of electrical power to the electrical power management system 104 on the supply side 102. In some embodiments, the demand requests specify a level of power that the customer 103 anticipates needing for a duration of time starting at a point in time. Using various types of data described below, the receiver 32 of the interface 20 of the electrical power management system 104 receives the demand request and generates a specific price quote for each demand request. The transmitter 36 transmits the specific price quote for each demand request back to the customer 103. With this technique of responding to each individual demand request, the electrical power management system 104 exerts a greater, or finer, level of control over forecasted and actual demand than is possible with conventional systems that simply provide a single price level to all customers for current power generation. With this greater level of control over forecasted demand, in the presence of variable supply from solar and wind energy, the electrical power management system 104 is better able to determine or anticipate when to activate or deactivate the power generation sources 105 and therefore, better able to ensure that the activated power generation sources 105 operate at maximum capacity or efficiency. For example, the specific price quote is set to encourage demand of the power in a first mode and to discourage demand of the power in a second mode to maximize efficient operating levels of the power generation sources in both the first mode and the second mode. Additionally, by receiving the specific price quote for a future block of electrical power, the individual customers 103 are better able to control their electricity consumption patterns and electricity bills than is possible with conventional systems wherein all customers simply receive the same price for current power consumption.

The electrical power management system 104 generally represents a computer system that may be a single computer device, multiple computer servers, one or more cloud-based applications, and/or other appropriate control devices. The power generation sources 105 include electric generators, batteries or alternative energy sources such as solar, wind, water, wave, hydroelectric, radiant, geothermal, compressed natural gas, biomass or nuclear. Data and commands are transmitted between the electrical power supply management system 104 and the power generation sources 105. The data generally include current power generation levels and reserve power capacity of the power generation sources 105. The commands control the operation of the power generation sources 105, for example, activating and deactivating each power generation source 105 as needed and or if/when available.

In some embodiments, the customer 103 may include one or more residential users, one or more commercial users, and/or one or more industrial users, or any combination thereof. The customer 103 has various electrical appliances and/or control units 107 within their premises or under their control. The appliances/units 107 may include circuitry, components or interface devices for generating the demand requests for blocks of electrical power. FIGS. 3A-3D show simplified examples of appliances/units 107 in accordance with some embodiments. FIG. 3A illustrates the appliance/unit 107 as an individual appliance and configured as a smart device in communication with the electrical power management system 104 through the data communication network 106. Examples include any type of IoT (Internet of Things) device, a heater device such as a furnace, an air conditioning device, a water heater, a household appliance, such as a refrigerator, an oven, a dishwasher, or a washing machine, or a media device such as a television, a laptop or a computer. In this way, the appliance/unit 107 generates the demand request for a block of electrical power based on its individual need. For example, a user may select a particular wash cycle on a washing machine. The washing machine then assesses its individual power needs and sends a demand request for a block of electrical power based on the requirements for this wash cycle.

In some embodiments, the appliance/unit 107 is a controller for the appliance coupled to the appliance or located remotely from the appliance. The controller for the appliance and the appliance are located in the same facility, such as a thermostat for a furnace or air conditioner. FIG. 3B shows the appliance/unit 107 as a controller for the appliance and in communication with the electrical power management system 104 through the data communication network 106. As in the washing machine scenario, the thermostat generates the demand request for a block of electrical power based on its individual need. For example, a user may program the thermostat to hold a particular temperature for 1 hour, then a hold a lower temperature for the following 2 hours. The thermostat assesses its individual power needs for this program (optionally including taking into account an outdoor local temperature forecast) and sends a demand request for a block of electrical power based on the requirements for this program.

The appliances/units 107 may represent a stand-alone control unit connected to control multiple appliances in a single facility such as a residential house or business. In some embodiments, the appliance/unit 107 is an electricity meter metering device configured to communicate with one or more appliances. The one or more appliances are located in the same facility. For example, the appliance/unit 107 is an electricity meter from the electricity power provider that measures the amount of electric energy consumed by a residence, a business, or an electrically powered device. This is typically installed at the premises to measure electric energy delivered to the customers for billing purposes. FIG. 3C shows the appliance/unit 107 as an electricity meter configured to communicate with one or more appliances in the same facility and in communication with the electrical power management system 104 through the data communication network 106. The electricity meter is in communication with all the appliances having power needs located in the same facility. In this way, the electricity meter generates the demand request for a block of electrical power based on the needs for an aggregate of appliances located in the same facility. For example, the electricity meter assesses its power needs for the aggregate of appliances for a particular duration such as 1 hour, 1 day, 1 week, or the like, and sends a demand request for a block of electrical power.

In other embodiments, the appliance/unit 107 is a stand-alone master controller configured to communicate with one or more appliances wherein the one or more appliances are located in a plurality of facilities, e.g., in the same subdivision, theme park or community. FIG. 3D shows the appliance/unit 107 as a master controller configured to communicate with one or more appliances in a plurality of facilities and in communication with the electrical power management system 104 through the data communication network 106. For example, residential homes in a subdivision may be in communication with the master controller so that the master controller is aware of their actual power usage, history and trends. The master controller generates the demand request for a block of electrical power based on the needs for an aggregate of appliances located in different facilities and part of the same network so that, for example, the power needs of all the homes located in the same subdivision are considered.

The demand side 101 and the supply side 102 are interconnected through the power grid 108. This may be unidirectional allowing power transmission from the supply side to the demand side, or optionally, bidirectional (as indicated by dashed line 109 in FIG. 2) enabling power transmission from the demand side 101 to the supply side 102. This may be convenient if the demand side 101 also generates their own power. Any overflow or oversupply of power generated by the demand side 101 may be sold or traded to the supply side 102.

The electrical power management system 104 uses various data, along with the data from the power generation sources 105, to determine how to manage the power generation sources 105 and how to respond to the demand requests from the customers 103, for example, determining when to activate and deactivate each power generation source 105. In some embodiments, the various data includes environmental factors 110 and a forecasted level of power consumption 111. The electrical power management system 104 receives or generates the environmental factors 110 and a forecasted level of power consumption 111. In addition, the environmental factors 110 and the forecasted level of power consumption 111 are evaluated when calculating the price quotes (to be provided in response to the demand requests for blocks of electrical power) to maximize efficient use of those power generation sources that are currently activated at any given time. For example, the forecasted level of power consumption 111 may be as close as possible, without exceeding, a forecasted level of power supply. Also, the current level of power consumption may be as close as possible, without exceeding, a current level of power supply. The evaluation and calculation may be accomplished by prediction algorithms and using, for example, Markov processes, as disclosed in U.S. Pat. No. 8,195,337, which is hereby incorporated by reference.

FIG. 4 is a flowchart for a method 400 for requesting blocks of electrical power in accordance with some embodiments. The illustrated steps are shown for explanatory purposes only. Other embodiments may use other steps, combinations of steps, or order of steps.

The method 400 begins with step 401. At step 401, in real-time, a first demand request for a first quantity of power for a first time period having a first starting time and a first duration is received by an electrical power supply management system 104 from a first appliance/unit 107. The first demand request is from the customer 103, unit or appliance on the demand side at a first time. For example, the demand request may be for a number of Watts over a duration of time such as 120 Watts of continuous power starting now and continuing for 20 minutes, which is referred to hereafter as a block. Blocks are used to ensure available power generation capacity without overcommitting the amount of power being sold. Another example of a block may be 10,000 Watts of continuous power starting today at 1:00 pm and continuing for 150 minutes. In some embodiments, the demand request may accommodate a particular device in a home or business that uses electricity, for example, an appliance such as a refrigerator, water heater, electric vehicle charger, or thermostat as discussed with reference to FIGS. 3A and 3B. In some embodiments, the demand request may be to accommodate a plurality of devices in the same home or business such as from an electricity meter as discussed with reference to FIG. 3C. In some embodiments, the demand request may be for a plurality of homes and businesses, e.g., in a subdivision or community as discussed with reference to FIG. 3D. The requested block of power in the demand request may be influenced by learned usage patterns of power consumption of the appliance/unit 107, such as historical on/off timing cycles and duty cycles for previous times of day, times of week, times of month, and/or times of seasons.

At step 402, the electrical power management system 104 generates a first price quote in response to the first demand request. The first price quote in response to the first demand request is based on an available power generation capacity of the power generation sources 105, the environmental factors 110 and the forecasted level of power consumption 111. The available power generation capacity is evaluated based on the state of operation of the available power generation sources 105. For example, in one scenario, the electricity power provider operates three power generation sources 105a, 105b and 105c, each of which provides its total power generation capacity, current operating capacity, and/or unused available capacity to the electrical power management system 104. The power generation sources 105a and 105b may be at 98% operating capacity, while 105c may be at 10% operating capacity. The environmental factors 110 on the demand side 101 and the supply side 102 are considered. These may include, but not be limited to, outdoor air temperature, relative humidity, diffuse and direct solar insolation, wind speed or the like. The forecasted level of power consumption 111 is assessed or generated based on historical data, predicted weather patterns, upcoming events such as holidays, or the like.

After consideration of the available power generation capacity, the environmental factors 110 and the forecasted level of power consumption 111, the first price quote, for example, in Watts per hour, for the first demand request for the block, or the quantity of power for the first time period, is calculated. In this example, the first price quote may be $0.15 kWh. At step 403, the first price quote is transmitted to the or the appliance/unit 107 and thus, the customer 103. This first price quote is available for a limited time period which is set by the electrical power management system 104. The limited time period may be at least one second, one minute, one hour or 24 hours.

Figure 5:
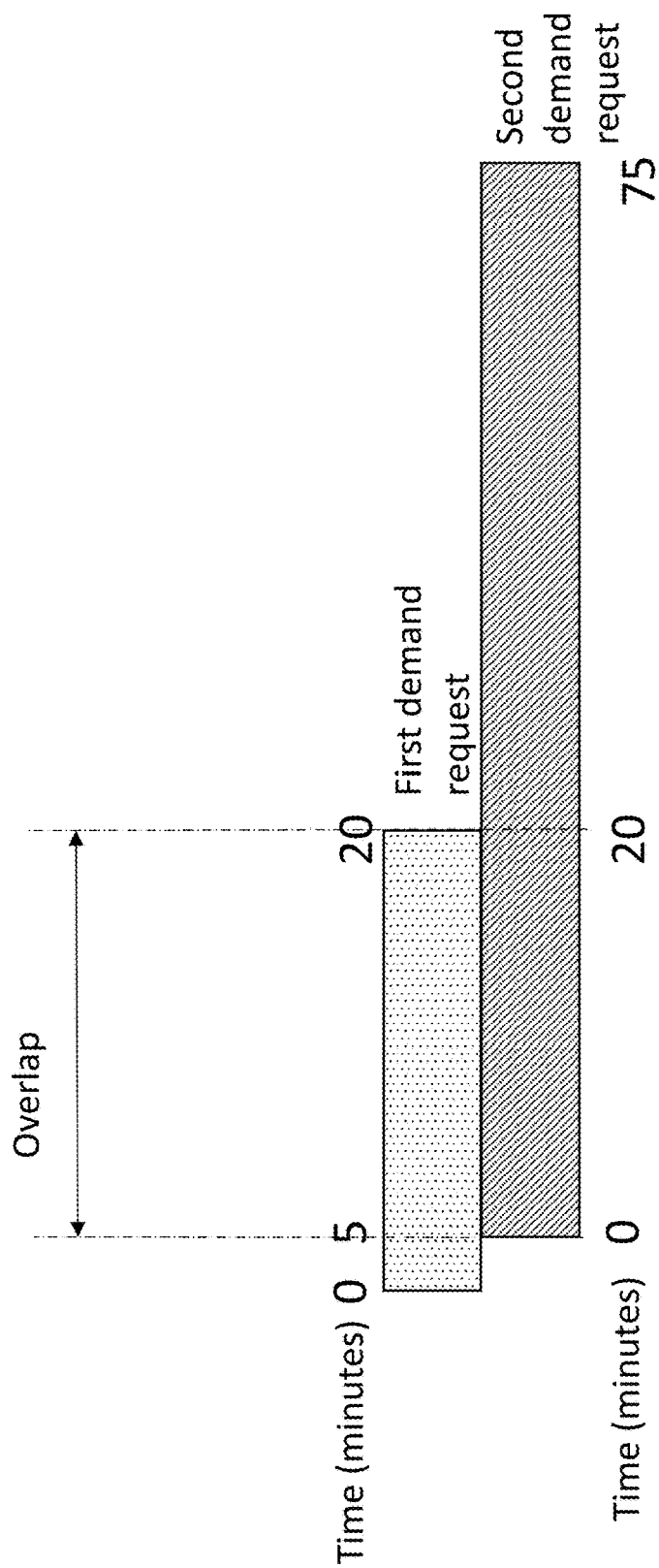
FIG. 5 is a simplified bar graph depicting the overlap of time between a first demand request and a second demand request.

At step 404, a second demand request for a second quantity of power for a second time period having a second starting time and a second duration is received in real time by the electrical power management system 104 from a second appliance/unit 107. The second starting time is different from the first starting time, and the second time period overlaps at least a portion of the first time period. The second appliance/unit 107 may be as defined in FIGS. 3A-3D and may be the same type or a different type of appliance/unit 107 as the first appliance/unit 107. For example, the first appliance/unit 107 may be a refrigerator and the second appliance/unit 107 may be an electricity meter. The second demand request may be for 15,000 Watts of continuous power starting now and continuing for the next 75 minutes. In this case, the second demand request was received five minutes after the first demand request (e.g., 120 Watts of continuous power starting now and continuing for 20 minutes), i.e., at a different, later time than the first demand request. Therefore, the second time period starts at a later point in time (e.g., 5 minutes) than when the first time period began. Since the first demand request is for 20 minutes and the second demand request is for 75 minutes but received 5 minutes later, the second time period overlaps at least a portion of the first time period for 15 minutes. FIG. 5 is a simplified bar graph depicting the overlap of time between the first demand request and the second demand request.

Figure 6A:
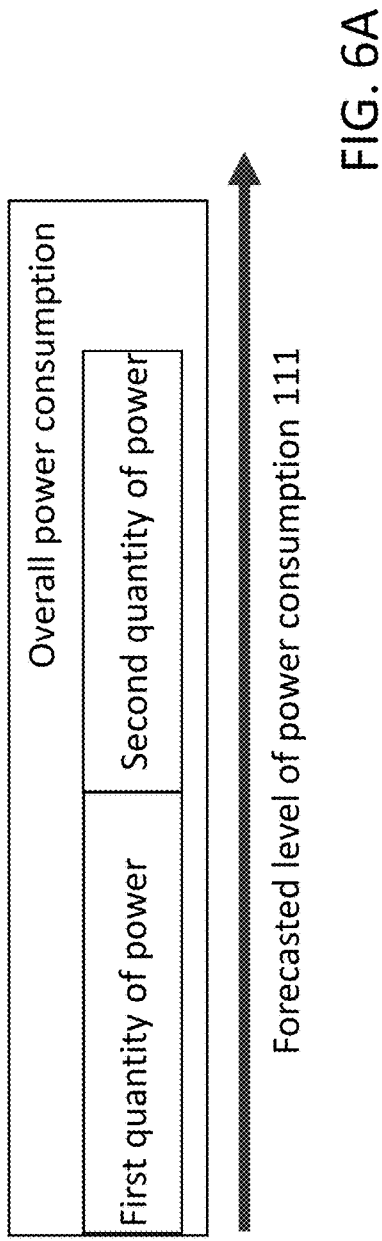
FIG. 6A is a simplified schematic of overall power consumption compared to a forecasted level of power consumption in accordance with some embodiments.

At step 405, the electrical power management system 104 generates a second price quote. The second price quote is based on the available power generation capacity of the power generation sources 105, the environmental factors 110 and the forecasted level of power consumption 111, which may have changed since the first price quote was generated. The available power generation capacity is evaluated based on the state of operation of the available power generation sources 105. In the previous scenario of the electricity power provider operating three power generation sources 105a, 105b and 105c, power generation sources 105a and 105b may be operating at 98% capacity while power generation source 105c may now be at be at 80% capacity. The environmental factors 110 on the demand side 101 and the supply side 102 are considered. The forecasted level of power consumption 111 is also assessed or generated. In some embodiments, the first quantity of power and the second quantity of power contribute to the overall power consumption which is less than the forecasted level of power consumption. When the overall power consumption is less than the forecasted level of power consumption 111, an additional power generation source 105 need not be activated. FIG. 6A is a simplified schematic of the overall power consumption compared to the forecasted level of power consumption 111 in accordance with some embodiments.

Figure 6B:
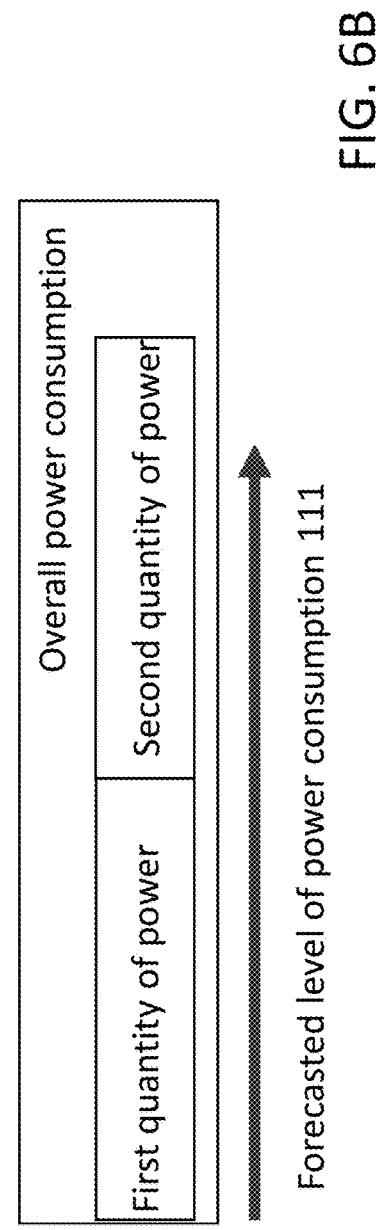
FIG. 6B is a simplified schematic of the overall power consumption compared to the forecasted level of power consumption in accordance with some embodiments.

In another embodiment, when the first quantity of power and the second quantity of power contributing to the overall power consumption is greater than the forecasted level of power consumption 111, an additional power generation source 105 may be activated to provide additional power. FIG. 6B is a simplified schematic of the overall power consumption compared to the forecasted level of power consumption 111 in accordance with some embodiments.

At step 406, after consideration of the available power generation capacity, the environmental factors 110 and the forecasted level of power consumption 111, the second price quote for the second demand request for the block of power, or a quantity of power for the second time period, is provided to the customer. In this example, the second price quote is $0.12 kWh. The order in which the first and second demand requests were received by the electrical power management system 104 is also indirectly evaluated in the second price quote because some of the available resources will have been committed in the first price quote, thereby impacting the available power generation capacity. This second price quote is available for a limited time period which is set by the electrical power management system 104. The limited time period may be at least one second, one minute, one hour or 24 hours.

In some embodiments, a non-transitory computer readable medium comprising instructions that, when executed by a processor, cause the processor to perform the method 400.

The value of the first price quote may be different from a value of the second price quote. FIGS. 7, 8A and 8B are simplified schematics detailing the power generation source capacity for the demand request in accordance with some embodiments. For example, although two of the generators, or power generators sources 105a and 105b are operating at 98% capacity and the power generation source 105c is at 80% capacity, therefore approaching full power generation capacity, the second price quote may be less than the first price quote—$0.12 kWh vs. $0.15 kWh. This may discourage power consumption use in the first mode, such as with the first demand request, while encouraging power consumption use in the second mode, such as with the second demand request. This is counterintuitive in the industry because typically, the same price is broadcast to all customers. Moreover, in a conventional system, the price quote increases as less resources are available and a higher, single price quote is broadcast to every customer. Therefore, all customers receive the same price quote for utilizing the power at the same time or in overlapping time periods.

In contrast, in the method 400 for managing demand requests for blocks of electrical power, the value of the first price quote (e.g., $0.15 kWh) and the value of the second price quote (e.g., $0.12 kWh) are set to maximize an operating efficiency of the power generation sources 105. For example, the value of the first price quote and the value of the second price quote are set to discourage demand of the power in a first mode and to encourage demand of the power in a second mode to maximize efficient operating levels of the power generation sources in both the first mode and the second mode. In some embodiments, this may mean to ideally and intentionally, operate the available power generation sources 105 at full capacity. In this way, customers 103 save money while the use of power generation sources 105 or energy resources is maximized and the efficiency of power generation is increased. In different situations, the customers 103 may be encouraged or discouraged to use power, with the intent of maximizing the efficiency of the available power generation capacity depending on the power generation sources, through the price quote. In some embodiments, this is achieved by operating all available power generation sources 105 at full capacity while offering a lower price quote. In conventional power supply systems, customers are discouraged from consuming power based on available resources. For example, it is known in the art that the pricing signal or price quote may be higher at peak power consumption times (i.e., the evening) based on the available power generation sources reaching maximum capacity. If the power generation sources reach a maximum capacity, a brownout may occur. Also, in conventional power supply systems, supply is used to meet demand. In the method 400 for managing demand requests for blocks of electrical power, in some situations, demand is encouraged to meet supply.

Curtailment of renewable resources may be defined as having the potential to produce power by a renewable source, but not producing or utilizing the power. For example, having a wind farm and on a windy day, but not utilizing the wind farm to produce power because, perhaps, demand is low. When using the method 400 for requesting blocks of electrical power, the first price quote and the second price quote are further based on a level of curtailment of power produced by renewable energy resources such as solar energy and wind energy when the power generator sources 105 are solar panels or windmills. The first price quote and the second price quote are generated to reduce the level of curtailment of power produced by solar energy and wind energy of at least one power generation source. This provides finer control over aggregate demand because, for example, if it's a sunny day, solar energy is available and should be utilized in that time period as opposed to missing the opportunity of the solar energy. By encouraging customer demand by offering a lower price quote, the power generator can take advantage of the solar energy. Moreover, other renewable energy sources are variable and should be taken advantage of when available.

Energy reserve may be defined as the amount of power generation capacity that can be used to produce active power over a given period of time and which has not yet been committed to the production of energy during this period. In accordance with some embodiments of the method for requesting a block of power, the first price quote and the second price quote are further based on an energy reserve. The first price quote and the second price quote are generated to reduce the energy reserve of at least one power generation source. This is possible because the power supply maximizes efficient operating levels of the power generation sources which in turn, minimizes the energy reserve.

In traditional power supply systems, all customers typically receive the same price for power consumption and a great amount of coincident response occurs. For example, at times, too much energy is created or available from the electricity power provider, with insufficient demand, so the current price for power is lowered to encourage demand for the currently available power. At other times, the demand is too great for the available power, so the current price for power is raised to discourage demand. These changes in current price create spikes or sudden changes in demand, instead of a smooth response. On the other hand, by using the method 400 for requesting blocks of electrical power whereby customers receive different price quotes for power based on the supply instead of the same broadcast price, sudden changes in demand are avoided or controlled in an efficient manner. The individual price quotes to the demand requests enable greater control or fine tuning of the demand, i.e., a "smoothing out" of the sudden changes in demand and orchestrating demand to efficiently meet available supply from conventional power generation sources and variable renewable resources such as solar energy and wind energy.

In some embodiments, based on the available power generator sources 105, the second demand request may not be met. In this case, the electrical power management system 104 may provide a higher price quote to discourage the customer from consuming power now, thus controlling the demand or decreasing the demand. Moreover, the higher price quote may also be necessary to give rise to a pent-up demand prior to activating another one of the power generation sources 105, so that as soon as the additional power generation source 105 is activated or becomes available, the price quotes can be lowered to quickly relieve the pent-up demand.

In some embodiments, the customer 103 may have their own power generation source, such as solar panels, fuel cells, wind turbines, or the like, which may be used in conjunction with power supplied by the electrical power management system 104. Thus, the customer 103 may sell an overflow or oversupply of their own produced power to the electrical power management system 104.

In some embodiments, renegotiation of the committed-to price quote is possible when in favor of a lower price for the customer 103. For example, a price quote may be provided to a customer 103 on a cloudy day when the production of solar energy is low or isn't feasible. If the clouds clear and the production of solar energy is now possible, renegotiation may occur, or the electrical power management system 104 may cancel all price quotes and broadcast a price for all customers 103 in order to make full use of the unexpected increase in available capacity.

In further embodiments, the electrical power management system 104 receives from the first appliance/unit 107, acceptance of the first price quote. The electrical power management system 104 then distributes the first quantity of power for the first time period starting at the first starting time to the first appliance/unit 107. Likewise, the electrical power management system 104 receives from the second appliance/unit 107, acceptance of the second price quote. The electrical power management system 104 then distributes the second quantity of power for the second time period starting at the second starting time to the second appliance/unit 107.

Figure 9:
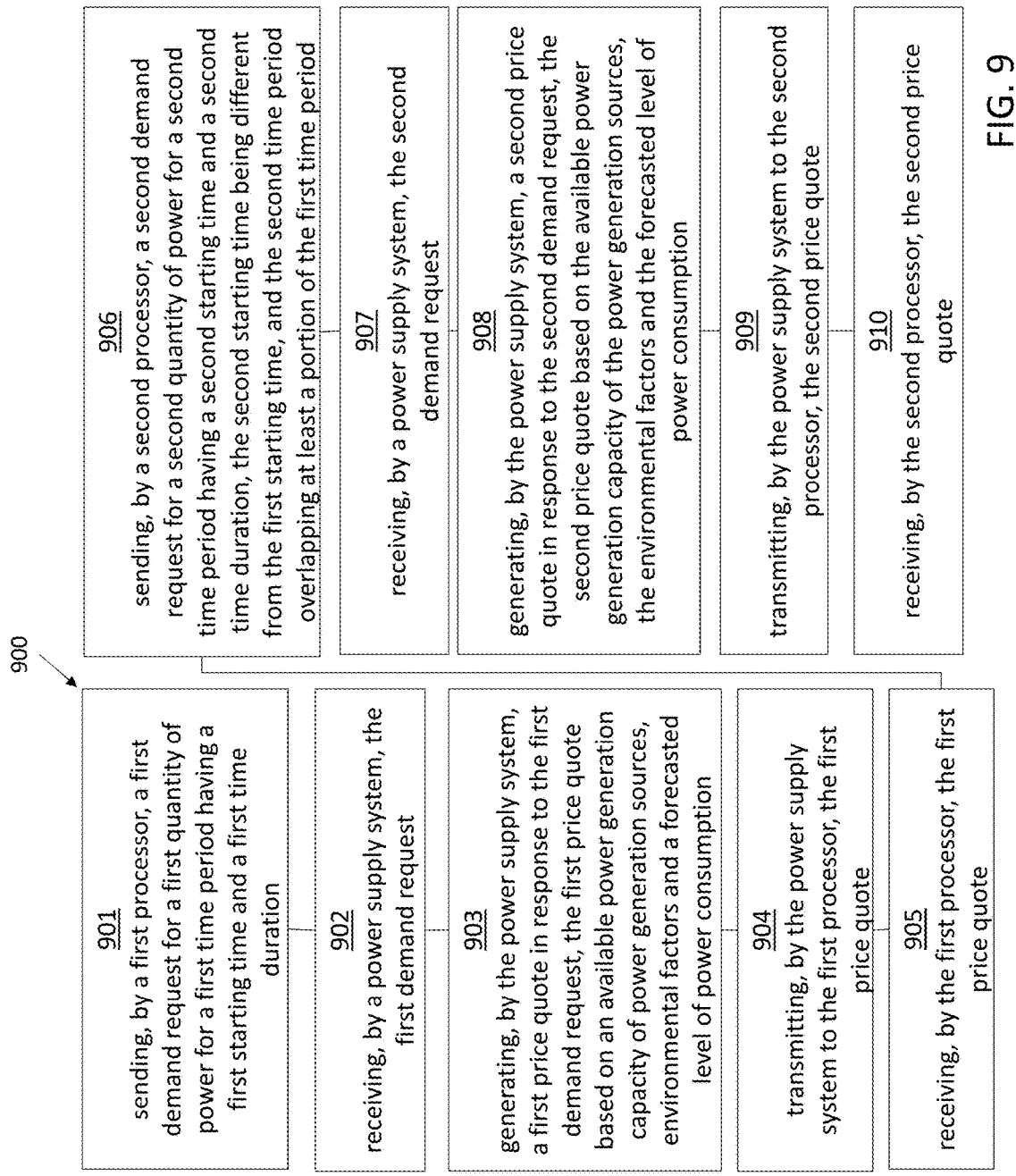
FIG. 9 is a method for requesting blocks of electrical power between a demand side and a supply side in accordance with some embodiments.

FIG. 9 is a method 900 for requesting blocks of electrical power between a demand side and a supply side in accordance with some embodiments. At step 901, a first processor sends a first demand request for a first quantity of power for a first time period having a first starting time and a first time duration. At step 902, the first demand request is received by a system. At step 903, the system generates a first price quote in response to the first demand request. The first price quote is based on an available power generation capacity of power generation sources, environmental factors and a forecasted level of power consumption. At step 904, the first price quote is transmitted to the first processor by the system. At step 905, the first price quote is received by the first processor.

At step 906, a second processor sends a second demand request for a second quantity of power for a second time period having a second starting time and a second time duration. The second starting time is different from the first starting time, and the second time period overlaps at least a portion of the first time period. At step 907, the system receives the second demand request. At step 908, the system generates a second price quote in response to the second demand request. The second price quote is based on the available power generation capacity of the power generation sources, the environmental factors and the forecasted level of power consumption. At step 909, the system transmits the second price quote to the second processor. At step 910, the second processor receives the second price quote. The value of the first price quote and the value of the second price quote are set to discourage demand of the power in a first mode and to encourage demand of the power in a second mode to maximize efficient operating levels of the power generation sources in both the first mode and the second mode.

In some embodiments, the method 900 further includes the first processor accepting the first price quote. The system then distributes the first quantity of power for the first time period starting at the first starting time.

A system 104 for requesting blocks of electrical power is also disclosed herein. Referring to FIG. 2, the system 104 includes a receiver 32 that receives a first demand request for a first quantity of power for a first time period having a first starting time and a first time duration from a first appliance/unit 107. The receiver 32 also receives a second demand request for a second quantity of power for a second time period having a second starting time and a second time duration from a second appliance/unit 107. The second starting time is different from the first starting time, and the second time period overlaps at least a portion of the first time period.

A processor 34 generates a first price quote in response to the first demand request. The first price quote is based on an available power generation capacity of power generation sources, environmental factors and a forecasted level of power consumption. The processor 34 also generates a second price quote in response to the second demand request. The second price quote is based on the available power generation capacity of power generation sources, the environmental factors and the forecasted level of power consumption.

A transmitter 36 transmits the first price quote to the first appliance/unit 107 and transmits the second price quote to the second appliance/unit 107. The value of the first price quote and the value of the second price quote are set to discourage demand of the power in a first mode and to encourage demand of the power in a second mode to maximize efficient operating levels of the power generation sources in both the first mode and the second mode.

Figure 10:
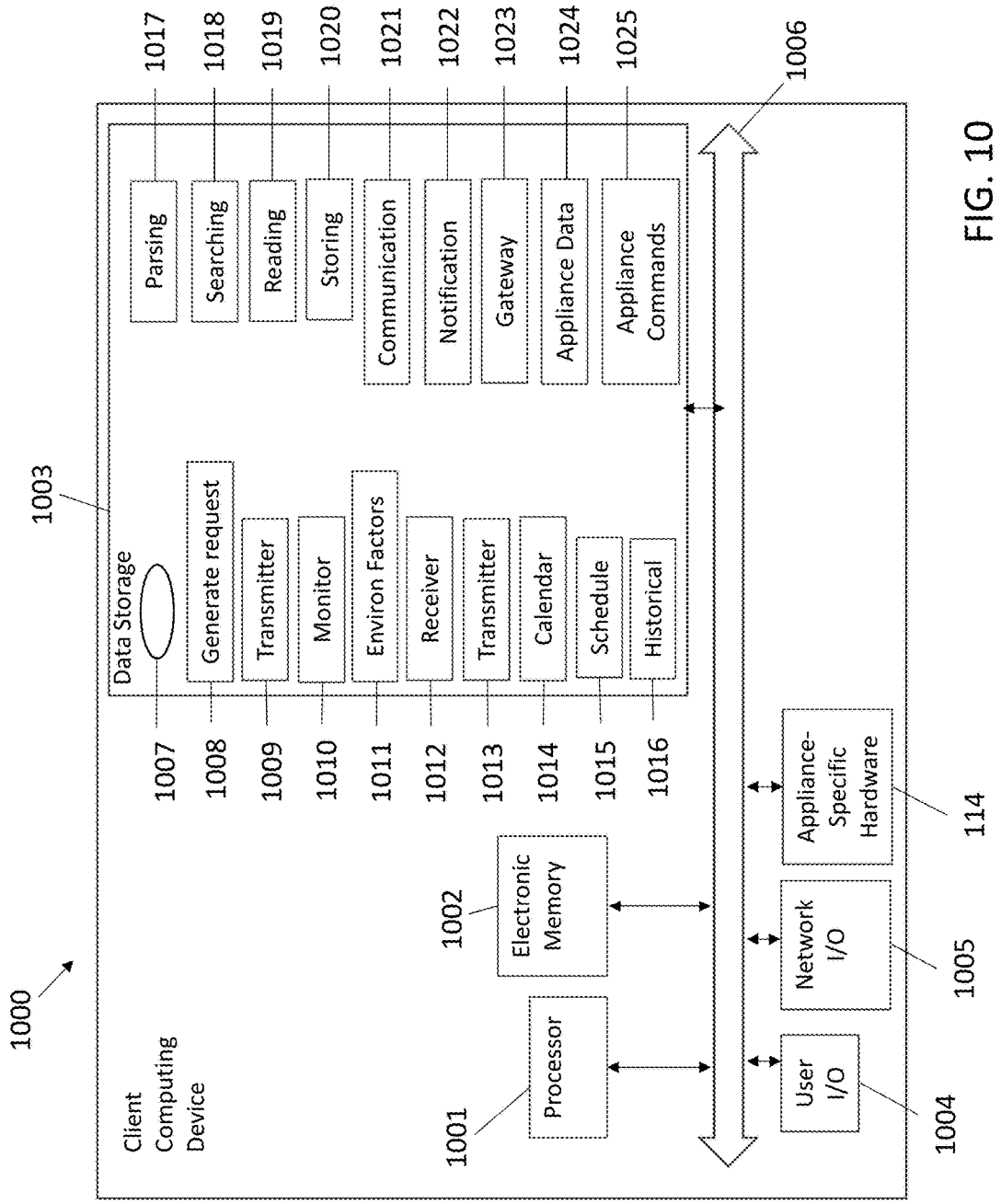
FIG. 10 is a simplified schematic diagram showing an example client computing device in accordance with some embodiments.

A simplified schematic diagram showing an example client computing device 1000 is shown in FIG. 10, in accordance with some embodiments. Other embodiments may use other components and combinations of components. For example, the client computing device 1000 may represent example hardware for performing various functions of the appliance/unit 107 such as a computer workstation, desktop computer, notebook computer, tablet computer, smart phone, cell phone, personal digital assistant, voice over Internet protocol (VoIP) phone, video phone, land line phone, smart watch, smart car, game console, etc. It may be a stand-alone device or part of the appliance/unit 107. In the illustrated embodiment, the client computing device 1000 generally includes at least one processor 1001, a main electronic memory 1002, a data storage 1003, a user I/O 1004, and a network I/O 1005, among other components not shown for simplicity, connected or coupled together by a data communication subsystem 1006. The client computing device 1000 may represent a control unit of the appliance/unit 107. In this integrated case, it receives status and sensor data and sends commands to appliance-specific hardware 114, such as control subsystems for IoT (Internet of Things)

devices, heating filaments for water heaters, pumps for clothes washers, thermostats for air conditioners.

The processor 1001 represents one or more central processing units on one or more PCBs (printed circuit boards). When executing computer-executable instructions for performing the above described functions of the client computing device 1000 in cooperation with the main electronic memory 1002, the processor 1001 becomes a special purpose computer for performing the functions of the instructions.

The main electronic memory 1002 represents one or more RAM modules on one or more PCBs in one or more housings or enclosures. In some embodiments, the main electronic memory 1002 represents multiple memory module units. In operation with the processor 1001, the main electronic memory 1002 stores the computer-executable instructions executed by, and data processed or generated by, the processor 1001 to perform the above described functions of the client computing device 1000.

The data storage 1003 represents or comprises any appropriate number or combination of internal or external physical mass storage devices, such as hard drives, optical drives, network-attached storage (NAS) devices, flash drives, etc. The data storage 1003 generally provides persistent storage (e.g., in a non-transitory computer readable medium 1007) for the programs (e.g., computer-executable instructions) and data used in operation of the processor 1001 and the main electronic memory 1002, such as, but not limited to, a routine for generating a demand request 1008, a transmitter 1009 for transmitting the demand request, a monitor program 1010 to collect inputs such as temperature from sensors, an environmental factors program 1011 that generates, receives or stores environmental factors, a receiver 1112 for receiving the price quote, a calendar services program 1014 for maintaining and providing calendar data for users of the system 100, a schedule services program 1015 for coordinating the scheduling of receiving power, historical data 1016 of previous demand requests and price quotes, one or more parsing routines 1017 for parsing data, a searching routine 1018 for searching through the various types of data for the relevant data, a reading routine 1019 for reading data from the data storage 1003 into the main electronic memory 1002, a storing routine 1020 for storing data from the main electronic memory 1002 to the data storage 1003, a network communication services program 1021 for sending and receiving network communication packets through the network 106, a notification service program 1022 for contacting customers, a gateway services program 1023 for serving as a gateway to communicate data between servers and customers, an appliance data 1024 representing status and sensor data received from the appliance-specific hardware 114 and an appliance commands 1025 representing commands provided to the appliance-specific hardware 114, among others. Under control of these programs and using this data, the processor 1001, in cooperation with the main electronic memory 1002, performs the above described functions for the client computing device 1000 as the control unit of the appliance/unit 107.

The user I/O 1004 represents one or more appropriate user interface devices, such as keyboards, pointing devices, displays, audio devices, etc. An owner or administrator, for example, may use these devices to access, setup and control the client computing device 1000 to operate the appliances, generate appropriate demand requests, and respond to received price quotes.

The network I/O 1005 represents any appropriate networking devices, such as network adapters, etc. for communicating through the network 106. The client computing device 1000 communicates with the system 100 through the network I/O 1005 to request data, send and receive data, among other activities to perform the above described functions of the client computing device 1000.

The data communication subsystem 1006 represents any appropriate communication hardware for connecting the other components in a single unit or in a distributed manner on one or more PCBs.

Figure 11:
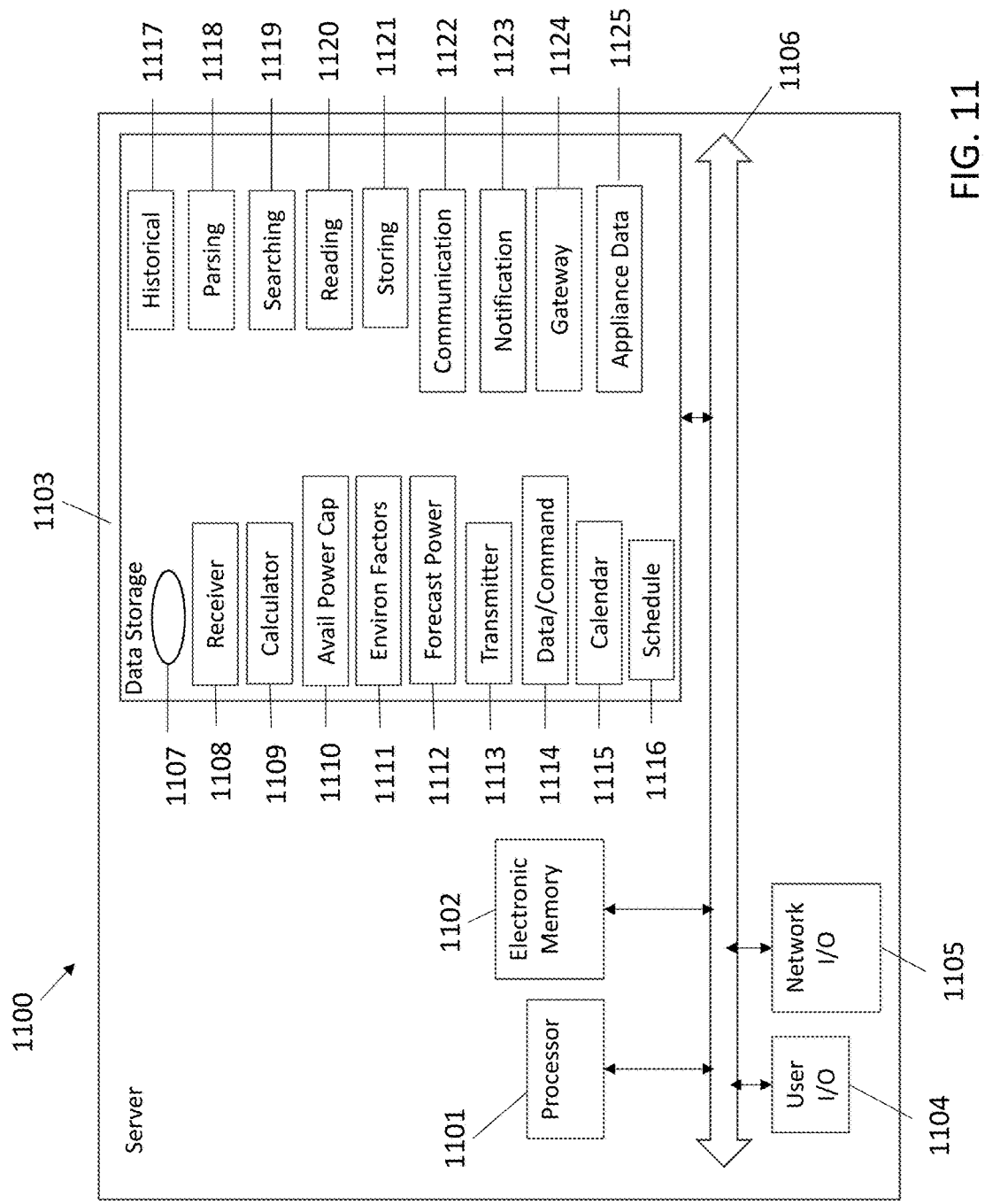
FIG. 11 is a simplified schematic diagram showing an example server in accordance with some embodiments.

A simplified schematic diagram showing an example server 1100 (representing any combination of one or more of the servers) for use in the system 100 is shown in FIG. 11, in accordance with some embodiments. Other embodiments may use other components and combinations of components. For example, the server 1100 may represent one or more physical computer devices or servers, such as web servers, rack-mounted computers, network storage devices, desktop computers, laptop/notebook computers, etc., depending on the complexity of the system 100. In some embodiments implemented at least partially in a cloud network potentially with data synchronized across multiple geolocations, the server 1100 may be referred to as one or more cloud servers. In some embodiments, the functions of the server 1100 are enabled in a single computer device. In more complex implementations, some of the functions of the computing system 1100 are distributed across multiple computer devices, whether within a single server farm facility or multiple physical locations. In some embodiments wherein the server 1100 represents multiple computer devices, some of the functions of the server 1100 are implemented in some of the computer devices, while other functions are implemented in other computer devices. In the illustrated embodiment, the server 1100 generally includes at least one processor 1101, a main electronic memory 1102, a data storage 1103, a user I/O 1104, and a network I/O 1105, among other components not shown for simplicity, connected or coupled together by a data communication subsystem 1106.

The processor 1101 represents one or more central processing units on one or more PCBs (printed circuit boards) in one or more housings or enclosures. In some embodiments, the processor 1101 represents multiple microprocessor units in multiple computer devices at multiple physical locations interconnected by one or more data channels, such as the network 106. When executing computer-executable instructions for performing the above described functions of the server 1100 in cooperation with the main electronic memory 1102, the processor 1101 becomes a special purpose computer for performing the functions of the instructions.

The main electronic memory 1102 represents one or more RAM modules on one or more PCBs in one or more housings or enclosures. In some embodiments, the main electronic memory 1102 represents multiple memory module units in multiple computer devices at multiple physical locations. In operation with the processor 1101, the main electronic memory 1102 stores the computer-executable instructions executed by, and data processed by, the processor 1101 to perform the above described functions of the server 1100.

The data storage 1103 represents or comprises any appropriate number or combination of internal or external physical mass storage devices, such as hard drives, optical drives, network-attached storage (NAS) devices, flash drives, etc. In some embodiments, the data storage 1103 represents multiple mass storage devices in multiple computer devices at multiple physical locations. The data storage 1103 generally provides persistent storage (e.g., in a non-transitory computer readable medium 1107) for the programs (e.g., computer-executable instructions) and data used in operation of the processor 1101 and the main electronic memory 1102, such as, but not limited to, a receiver for receiving a demand request 1108, a calculator for generating a price quote in response to the demand request 1109, a list of available power generation capacity of power generation sources 1110, an environmental factors program 1111 that generates, receives or stores environmental factors regarding the demand side and the supply side, a list of forecasted level of power consumption 1112 received or generated by the server 1100, a transmitter 1113 for transmitting the price quote, a data and command program 1114 which are transmitted between the electrical power supply management system 104 and the power generation sources 105, a calendar services program 1115 for maintaining and providing calendar data for users of the system 100, a schedule services program 1116 for coordinating the scheduling of the distribution of power, historical data 1117 of previous demand requests and price quotes, one or more parsing routines 1118 for parsing data, a searching routine 1119 for searching through the various types of data for the relevant data to be sent to customers, a reading routine 1120 for reading data from the data storage 1103 into the main electronic memory 1102, a storing routine 1121 for storing data from the main electronic memory 1102 to the data storage 1103, a network communication services program 1122 for sending and receiving network communication packets through the network 106, a notification service program 1123 for contacting customers, a gateway services program 1124 for serving as a gateway to communicate data between servers and customers, appliance data 1125 representing data received from the appliances/units 107, among others. Under control of these programs and using this data, the processor 1101, in cooperation with the main electronic memory 1102, performs the above described functions for the server 1100 as the electrical power supply management system 104.

The user I/O 1104 represents one or more appropriate user interface devices, such as keyboards, pointing devices, displays, etc. In some embodiments, the user I/O 1104 represents multiple user interface devices for multiple computer devices at multiple physical locations. A system administrator, for example, may use these devices to access, setup and control the server 1100.

The network I/O 1105 represents any appropriate networking devices, such as network adapters, etc. for communicating through the network 106. In some embodiments, the network I/O 1105 represents multiple such networking devices for multiple computer devices at multiple physical locations for communicating through multiple data channels. The appliance/unit 107 communicates with the server 1100 through the network I/O 1105 to send demand requests, receive price quotes, send confirmation to accept the price quote and any other notifications. Different servers may communicate with each other through the network I/O 1105 of each server to perform the above described functions of the system 100.

The data communication subsystem 1106 represents any appropriate communication hardware for connecting the other components in a single unit or in a distributed manner on one or more PCBs, within one or more housings or enclosures, within one or more rack assemblies, etc.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the invention. Thus, it is intended that the present subject matter covers such modifications and variations.

What is claimed is:

1. A method comprising:
   receiving, by a system from a first unit of a facility, a first demand request for a first quantity of power for a first time period having a first starting time and a first duration;
   generating, by the system, a first price quote in response to the first demand request, the first price quote based on an available power generation capacity of a power generation source of the facility or of a power generation source of an electrical power provider, environmental factors, and a forecasted level of power consumption, wherein the facility and the electrical power provider are separate;
   transmitting, by the system to the first unit, the first price quote;
   receiving, by the system from a second unit of the facility, a second demand request for a second quantity of power for a second time period having a second starting time and a second duration, the second starting time being different from the first starting time, and the second time period overlapping at least a portion of the first time period;
   generating, by the system, a second price quote in response to the second demand request, the second price quote based on the available power generation capacity of the power generation source of the facility or of the power generation source of the electrical power provider, the environmental factors, and the forecasted level of power consumption; and
   transmitting, by the system to the second unit, the second price quote;
   wherein the value of the first price quote and the value of the second price quote are set to discourage demand of the power in a first mode and to encourage demand of the power in a second mode to maximize an efficient operating level of the power generation source of the facility or the power generation source of the electrical power provider in both the first mode and the second mode;
   wherein the efficient operating level of the power generation source of the facility in the first mode is lower than the efficient operating level of the power generation source of the facility in the second mode, or the efficient operating level of the power generation source of the electrical power provider in the first mode is lower than the efficient operating level of the power generation source of the electrical power provider in the second mode; and
   wherein the first unit and the second unit are controlled automatically based on the first and second price quotes to maximize the efficient operating level of the power generation source of the facility or the power generation source of the electrical power provider in both the first mode and the second mode.

2. The method of claim 1, wherein the power generated by the power generation source of the facility is stored in a distributed generation storage system.

3. The method of claim 1, wherein an overflow of power produced by the power generation source of the facility is sold or traded.

4. The method of claim 1, wherein the power generation source of the facility and the power generation source of the electrical power provider are a solar panel, fuel cell, wind turbine, or other energy source.

5. The method of claim 1, wherein the first unit or the second unit includes:
(i) an appliance;
(ii) a controller for the appliance coupled to the appliance or located remotely from the appliance, the controller and appliance located in the facility;
(iii) an electricity meter configured to communicate with one or more appliances, the one or more appliances located in the facility; or
(iv) a master controller configured to communicate with one or more appliances, the one or more appliances located in a plurality of facilities.

6. The method of claim 1, wherein the environmental factors include outdoor air temperature, relative humidity, diffuse and direct solar insolation and wind speed.

7. The method of claim 1, wherein:
the first price quote and the second price quote are further based on an energy reserve; and
the first price quote and the second price quote are generated to reduce the energy reserve of at least one power generation source.

8. The method of claim 1, wherein:
the first price quote and the second price quote are further based on a level of curtailment of power produced by solar energy, wind energy, and other energy sources; and
the first price quote and the second price quote are generated to reduce the level of curtailment of power produced by solar energy, wind energy, and other energy sources, of at least one power generation source.

9. A method comprising:
sending, by a first processor of a facility, a first demand request for a first quantity of power for a first time period having a first starting time and a first time duration,
receiving, by a system, the first demand request;
generating, by the system, a first price quote in response to the first demand request, the first price quote based on an available power generation capacity of a power generation source of the facility or of a power generation source of an electrical power provider, environmental factors, and a forecasted level of power consumption, wherein the facility and the electrical power provider are separate;
transmitting, by the system to the first processor, the first price quote;
receiving, by the first processor, the first price quote;
sending, by a second processor of the facility, a second demand request for a second quantity of power for a second time period having a second starting time and a second time duration, the second starting time being different from the first starting time, and the second time period overlapping at least a portion of the first time period;
receiving, by the system, the second demand request;
generating, by the system, a second price quote in response to the second demand request, the second price quote based on the available power generation capacity of the power generation source of the facility or of the power generation source of the electrical power provider, the environmental factors, and the forecasted level of power consumption;
transmitting, by the system to the second processor, the second price quote; and
receiving, by the second processor, the second price quote;
wherein the value of the first price quote and the value of the second price quote are set to discourage demand of the power in a first mode and to encourage demand of the power in a second mode to maximize an efficient operating level of the power generation source of the facility or the power generation source of the electrical power provider in both the first mode and the second mode;
wherein the efficient operating level of the power generation source of the facility in the first mode is lower than the efficient operating level of the power generation source of the facility in the second mode, or the efficient operating level of the power generation source of the electrical power provider in the first mode is lower than the efficient operating level of the power generation source of the electrical power provider in the second mode; and
wherein the first processor and the second processor are controlled automatically based on the first and second price quotes to maximize the efficient operating level of the power generation source of the facility or the power generation source of the electrical power provider in both the first mode and the second mode.

10. The method of claim 9, wherein the power generated by the power generation source of the facility is stored in a distributed generation storage system.

11. The method of claim 9, wherein an overflow of power produced by the power generation source of the facility is sold or traded.

12. The method of claim 9, wherein the power generation source of the facility and the power generation source of the electrical power provider are a solar panel, fuel cell, wind turbine, or other energy source.

13. The method of claim 9, wherein the first processor or the second processor includes:
(i) an appliance;
(ii) a controller for the appliance coupled to the appliance or located remotely from the appliance, the controller and appliance located in the facility;
(iii) an electricity meter configured to communicate with one or more appliances, the one or more appliances located in the facility; or
(iv) a master controller configured to communicate with one or more appliances, the one or more appliances located in a plurality of facilities.

14. The method of claim 9, wherein the environmental factors include outdoor air temperature, relative humidity, diffuse and direct solar insolation and wind speed.

15. The method of claim 9, wherein:
the first price quote and the second price quote are further based on an energy reserve; and
the first price quote and the second price quote are generated to reduce the energy reserve of at least one power generation source.

16. The method of claim 9, wherein:
the first price quote and the second price quote are further based on a level of curtailment of power produced by solar energy, wind energy, and other energy sources; and
the first price quote and the second price quote are generated to reduce the level of curtailment of power produced by solar energy, wind energy, and other energy sources of at least one power generation source.

17. A system comprising:

a receiver, the receiver receiving (i) from a first unit of a facility, a first demand request for a first quantity of power for a first time period having a first starting time and a first time duration, and (ii) from a second unit of the facility, a second demand request for a second quantity of power for a second time period having a second starting time and a second time duration, the second starting time being different from the first starting time, and the second time period overlapping at least a portion of the first time period;

a processor, the processor generating (i) a first price quote in response to the first demand request, the first price quote based on an available power generation capacity of a power generation source of the facility or of a power generation source of an electrical power provider, environmental factors, and a forecasted level of power consumption, and (ii) a second price quote in response to the second demand request, the second price quote based on the available power generation capacity of the power generation source of the facility or of the power generation source of the electrical power provider, the environmental factors, and the forecasted level of power consumption; and a transmitter, the transmitter transmitting to (i) the first unit, the first price quote, and (ii) the second unit, the second price quote;

wherein the facility and the electrical power provider are separate;

wherein the value of the first price quote and the value of the second price quote are set to discourage demand of the power in a first mode and to encourage demand of the power in a second mode to maximize an efficient operating level of the power generation source of the facility or the power generation source of the electrical power provider in both the first mode and the second mode;

wherein the efficient operating level of the power generation source of the facility in the first mode is lower than the efficient operating level of the power generation source of the facility in the second mode, or the efficient operating level of the power generation source of the electrical power provider in the first mode is lower than the efficient operating level of the power generation source of the electrical power provider in the second mode; and wherein the first unit and the second unit are controlled automatically based on the first and second price quotes to maximize the efficient operating level of the power generation source of the facility or the power generation source of the electrical power provider in both the first mode and the second mode.

18. The system of claim 17, wherein the power generated by the power generation source of the facility is stored in a distributed generation storage system.

19. The system of claim 17, wherein an overflow of power produced by the power generation source of the facility is sold or traded.

20. The system of claim 17, wherein the environmental factors include outdoor air temperature, relative humidity, diffuse and direct solar insolation and wind speed.

* * * * *